May 10, 1960 W. C. LYONS, JR 2,935,870
ACCELERATION INSENSITIVE SKIN FRICTION BALANCE
Filed May 9, 1958

INVENTOR.
WILLIS C. LYONS, JR.
BY
ATTORNEYS

United States Patent Office 2,935,870
Patented May 10, 1960

2,935,870
ACCELERATION INSENSITIVE SKIN FRICTION BALANCE

Willis C. Lyons, Jr., Irving, Tex., assignor to the United States of America as represented by the Secretary of the Navy Application May 9, 1958, Serial No. 734,374

8 Claims. (Cl. 73—147)

This invention relates in general to skin friction measuring devices and more particularly to a skin friction balance which is insensitive to acceleration forces.

Skin friction drag has evolved now to the point where it has become an appreciable factor in the total drag acting on a body. It is therefore evident that an effective method for determining the magnitude of this force is of prime importance to the present day designer of high speed aircraft. Today methods are available for the analytical determination of the skin friction on a body traveling at supersonic speeds; which means that the effect of compressibility and heat transfer must be taken into account. It is apparent, however, that a need exists for experimental skin friction data obtained under various conditions. Experimental data with which the results of theoretical predictions may be correlated are essential to ascertain the reliability of analytical methods for the determination of skin friction.

Although the wind tunnel affords an excellent means for obtaining needed data, it also places certain restrictions on the conditions under which the data may be obtained. For example, the Mach number is limited in wind tunnel testing. There are also problems present in shock wave interference and suitably controlling the rate of heat transfer so that free flight conditions may be more closely simulated. A further source of error in wind tunnel data is derived from velocity fluctuation or turbulence in the test section. This has a large effect on the degree to which measurements performed on models can be applied to full-scale aircraft.

Free flight testing is the logical solution to the wind tunnel problems. However inertial loads resulting from acceleration can have an adverse effect upon measuring instruments.

The primary object of this invention is to provide a skin friction balance for free flight testing which is insensitive to acceleration forces.

A further object is to provide a skin friction balance for free flight testing that has a greater Mach number capability.

Another object is to provide a skin friction balance for free flight testing which is unaffected by shock wave interference.

A further object is to provide a skin friction balance which is unaffected by velocity fluctuations.

Other objects and many of the attendant advantages of this invention will be readily appreciated as the same becomes better understood by reference to the following detailed description when considered in connection with the accompanying drawings, wherein.

Generally the scheme used in this invention utilizes the so-called "floating element" technique. This involves supporting a small element of the surface of a missile separately from the rest of the surface on small columns or leaf type flexures, the element functioning as a test piece by which skin friction drag on the surface of the missile is determined. This "floating element" is mounted on these leaf flexures such that it can have a small amount of motion with respect to the rest of the missile, but always remain flush with the surfaces around it for small degrees of travel. This element can have only one degree of freedom which is along a line parallel to the direction of fluid flow. The leaf type flexures also serve the purpose of introducing a restraint to the motion of the element as it is being acted upon by a shear force. To indicate the movement of the element with respect to the rest of the missile, a linear variable differential transformer is used, with the moveable core of the transformer attached rigidly to the floating element. The transformer coils are then fixed with respect to the missile body. As is obvious from the intended function of the invention, the longitudinal central axis of the transformer coils and the moveable core are arranged parallel to the afore-mentioned line along which the floating element test piece must move, such line of movement being in alignment with the direction of fluid flow. Measuring the distance the element is displaced against the force of the leaf flexures of known spring constant allows the shear force acting on the element to be readily determined.

Figure 1:
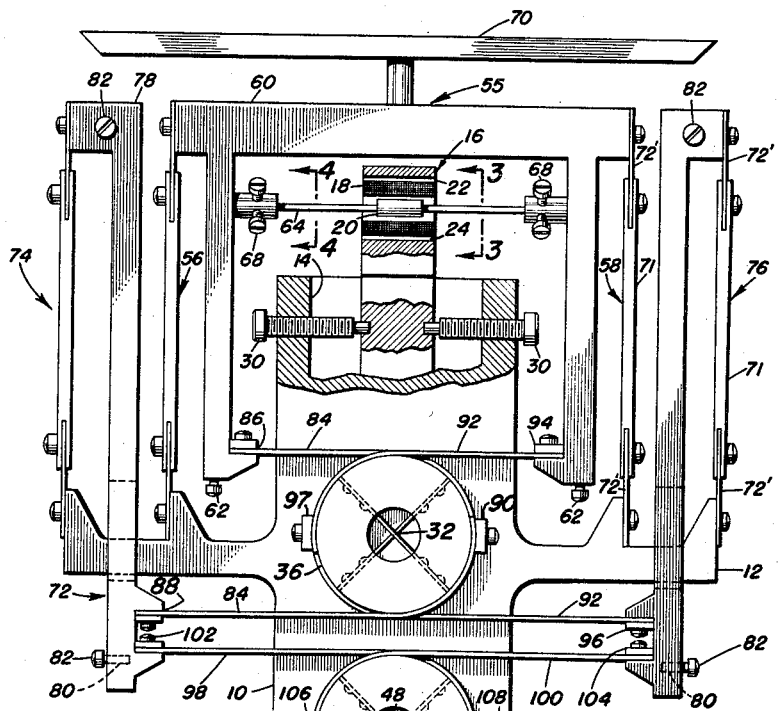
Fig. 1 is a schematic showing of the essential features of the present invention.
Figure 3:
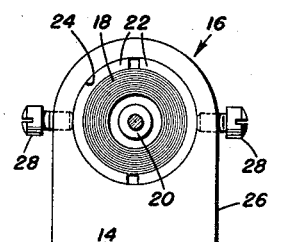
Fig. 3 is a detail section, on line 3—3 of Fig. 1, showing the linear variable differential transformer employed.

Referring to Fig. 1, the skin friction balance includes a base 10 on which all the moving parts of the balance are mounted. The base 10 includes a flange 12 and a recess 14. A linear variable differential transformer 16 is mounted on the top of base 10. The transformer 16 includes stationary coils 18 and a moveable core 20. The coils 18 are enclosed in a split aluminum sleeve 22 (Fig. 3) which is secured within an aperture 24 in a mounting block 26 by set screws 28. The mounting block 26 fits into the recess 14 in the base 10 and is secured in the frame by opposing screws 30. The mounting block 26 is allowed one-quarter inch of travel with respect to the base 10 and may be adjusted to the desired position by the screws 30.

Figure 2:
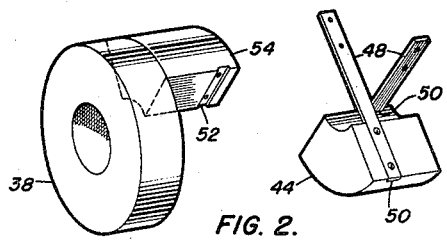
Fig. 2 is an exploded view of one of the frictionless pivots.
Figure 2:
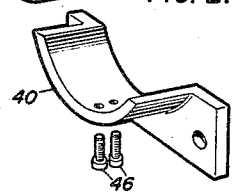

Located at points 32 and 34 on the base 10 are two pairs of discs 36 and 38. Since the shear loads to be measured are very small, even the slightest amount of friction present in the system would be extremely detrimental. For this reason, where movement about a fixed point was necessary, flexure pivots with fixed centers of rotation were used. One of the pivots used in the balance is shown in Fig. 2. A pivot mounting block 40 is secured to the base 10 by screws 42. A fixed quadrant 44 of the pivot is set in the pivot block 40 and held in place by screws 46. Two thin springs 48 are secured in the grooves 50 of the fixed quadrant 44, are then crossed and secured in grooves 52 of the shiftable quadrant 54. The two springs 48 are crossed such that the axis of each spring, about which the moment of inertia of the cross sectional area is least, coincides with the desired axis of rotation of the pivot. The disc 38 is secured to the shiftable quadrant 54 such that its center of gravity is located at the axis of rotation of said pivot. For small angles of movement, the axis of rotation will lie at the intersecting point of the two springs 48.

Figure 4:
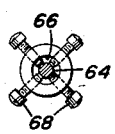
Fig. 4 is a detail section, on line 4—4 of Fig. 1, showing the transformer core adjusting means.

Mounted on the flange 12 is the shear force measuring system 55 comprising two pairs of flexures 56 and 58 which support a central body section 60 whose center of gravity is adjustably located by four screws 62. Rigidly attached to the central body section 60 is the core 20 of the transformer 16. The core 20 is mounted on a Bakelite rod 64. Each end of the rod 64 is inserted in a hole 66 (Fig. 4) which is slightly larger than the diameter of the rod. Extending into the holes 66 radially and spaced 90 degrees apart are four screws 68 which can be tightened on the rod 64 in such manner that it can be positioned in any location in the holes 66. The center line of the holes 66 and the transformer coils 18 coincide. This adjustment then allows the core 20 to be accurately positioned inside the coils 18 and is necessary since any contact between the core 20 and coils 18 would result in an intolerable amount of friction in the system.

The flexures 56 and 58 are composed of two parts; an aluminum strut 71 with Phosphor-bronze strips 72' attached at each end. This configuration affords a maximum amount of column rigidity with a minimum value for the spring constant. Mounted on the central body 60 is the floating surface element, or test piece, 70. This element has the same contour as the surface of the missile which is to be tested, the element forming, as previously indicated, a portion of said surface.

Also mounted on the flange 12 is a counterweight system 72 comprising two pairs of flexures 74 and 76 which support a rectangular frame 78 that surrounds the first system 55. The weight and center of gravity of system 72 are made variable by providing a number of threaded holes 80 in the frame 78 and varying the location and number of screws 82 inserted in the holes 80.

The measuring and counterweight systems 55 and 72 are interconnected by means of a number of thin bands in such a manner that no friction exists in the connection. This is accomplished by attaching a first thin beryllium copper band 84 by any suitable means to the central body 60 at point 86 and wrapping this band around disc 36 and attaching it to frame 78 at point 88. The band is attached to the disc 36 at point 90. A second band 92 is attached to central body 60 at point 94 and wrapped around the opposite side of disc 36 and attached to frame 78 at point 96. The second band 92 is attached to disc 36 at point 97.

The counterweight system 72 is also connected to disc 38 by bands 98 and 100 which are attached to frame 78 at points 102 and 104, respectively, and to disc 36 at points 106 and 108, respectively.

In operation counterweight system 72 is adjusted to have the same mass as measuring system 55 by inserting or removing screws 82. The centers of gravity of the two systems 55 and 72 are located at the same point in space by adjusting screws 62 and 82, respectively. Also the mass moment of inertia of discs 36 should be equal to discs 38.

A force acting on measuring system 55 due to a pure linear acceleration will be acting on counterweight system 72 with the same magnitude and in the same direction, since system 55 and system 72 have identical masses and coinciding centers of gravity. These forces will result in moments about point 32, through disc 36, which are equal in magnitude, but opposite in direction and will therefore be cancelled. Linear acceleration will produce no motion in discs 36 and 38, since both discs are restricted to rotational motion and have their centers of gravity located at the pivot points 32 and 34, respectively.

Torques resulting from an angular acceleration can effect only discs 36 and 38 since the systems 55 and 72 are restricted to translatory motion only by their supporting main flexures. The torques produced in discs 36 and 38 will be equal in magnitude and direction since the mass moment of inertia of disc 36 about point 32 is equal to the mass moment of inertia of disc 38 about point 40. The moments of inertia are equal since it has been previously stated that discs 36 and 38 are to be identical parts. These torques will tend to cause discs 36 and 38 to rotate in the same direction about points 32 and 34 respectively. The design of the instrument, however, will not allow discs 36 and 38 to rotate in the same direction simultaneously, and therefore, the effects of angular acceleration are also cancelled. Consequently, the complete instrument is insensitive to both linear and angular accelerations.

The actual force measurement with the balance is accomplished by measuring the displacement of the floating surface element, or test piece, 70, with respect to the fixed base 10 as it is acted upon by a shear force against the known force supplied by the main flexures 56, 58, 74 and 76.

Obviously many modifications and variations of the present invention are possible in the light of the above teachings. It is therefore to be understood that within the scope of the appended claims the invention may be practiced otherwise than as respectfully described.

What is claimed is:

1. A device for measuring skin friction drag on the surface of a missile, comprising, a base, a skin friction measuring system mounted on said base, a counterweight system mounted on said base and surrounding said measuring system, means including frictionless pivots interconnecting said measuring and counterweight systems so that said systems are insensitive to acceleration forces, a floating surface element test piece mounted on said measuring system and forming a portion of the surface of said missile, said element being flush with the surface of said missile, and means mounted on said base for determining the displacement of said element due solely to skin friction drag, said device, with the exception of said test piece element, being disposed entirely within said missile when operatively associated therewith, whereby the constituent components thereof are contained within and are supported by the missile.

2. A device for measuring skin friction drag on the surface of a missile which is insensitive to acceleration forces, comprising, a base, a skin friction measuring system including a first set of flexures supporting said measuring system on said base, a counterweight system surrounding said measuring system and being supported on said base by a second set of flexures, means connecting said measuring system to said counterweight system including frictionless discs whereby said systems are insensitive to acceleration forces, a floating surface element test piece mounted on said measuring system and forming a portion of the surface of said missile, said element being flush with the surface of said missile, and means mounted on said base for determining the displacement of said element due to skin friction drag, said device, with the exception of said test piece element, being disposed entirely within said missile when operatively associated therewith, whereby the constituent components thereof are contained within and are supported by the missile.

3. A device for measuring skin friction drag on the surface of a missile comprising, a base, a skin friction measuring system mounted on said base, a counterweight system mounted on said base and surrounding said measuring system, said measuring and counterweight systems being of the same mass and having their centers of gravity at the same point in space, means, including frictionless pivots interconnecting said systems so that they are insensitive to acceleration forces, test piece means mounted on said measuring system, said means forming a portion of and being flush with the surface of said missile and means for measuring the displacement of said last-mentioned means due to skin friction drag, said device, with the exception of said test piece means, being disposed entirely within said missile when operatively associated therewith, whereby the constituent components thereof are contained within and are supported by the missile.

4. A device for measuring skin friction drag on the surface of a missile, comprising, a skin friction measuring system and a counterweight system having equal mass and having their centers of gravity at the same point in space, a base, means for mounting said systems on said base, two pairs of frictionless pivots secured to said base, means connecting said systems including bands secured to said pivots so that said systems are insensitive to acceleration forces, test piece means mounted on said measuring system, said means forming a portion of and being flush with the surface of said missile and being responsive to skin friction drag, and means for recording the displacement of said last-mentioned means, said device, with the exception of said test piece means, being disposed entirely within said missile when operatively associated therewith, whereby the constituent components thereof are contained within and are supported by the missile.

5. A device for measuring skin friction drag on the surface of a missile, comprising, a base, means securing a transformer coil to said base, a measuring system supporting a test piece floating surface element thereon, said element forming a portion of and being flush with the surface of said missile, a first set of flexures movably supporting said measuring system on said base, a transformer core adjustably secured to said measuring system and passing through said transformer coil, a counterweight system surrounding said measuring system, a second set of flexures movably supporting said counterweight system on said base, first and second pairs of discs, means for frictionlessly mounting said discs on said base, means for connecting said measuring system to said counterweight system including metallic bands attached to said first pair of discs so that said systems are insensitive to linear acceleration forces, means connecting said counterweight system to said second pair of discs including metallic bands so that said pairs of discs are insensitive to angular acceleration forces whereby displacement of said surface element will be due solely to skin friction drag forces and displacement of said transformer core with respect to said transformer coil will sense the skin friction drag force, said device, with the exception of said test piece element, being disposed entirely within said missile when operatively associated therewith, whereby the constituent components thereof are contained within and are supported by the missile.

6. A skin friction balance for measuring the skin friction drag on a floating test piece element of the surface of a missile, comprising, a base, a skin friction measuring system, means mounting said measuring system on said base, a counterweight system surrounding said measuring system, means mounting said counterweight system on said base, a first pair of pivots attached to said base, said pivots each including a fixed quadrant, a shiftable quadrant and a pair of crossed springs connecting said quadrants, a pair of discs attached to said shiftable quadrants and having their centers of gravity coaxial with the intersection of said crossed springs, a first pair of bands attached at one end to said measuring system and at the other end to said counterweight system and passing around one-half of said discs, a second pair of bands attached to said systems and passing around the opposite half of said discs so that said systems are insensitive to linear acceleration forces, a second pair of pivots and discs, means connecting said second pair of pivots and discs to said base, means connecting said counterweight system to said second pair of discs so that said first and second pair of discs are insensitive to angular acceleration forces and means for sensing and recording the skin friction drag forces on the floating test piece element of the surface of said missile, said balance being disposed entirely within said missile when operatively associated therewith, whereby the constituent components thereof are contained within and are supported by the missile.

7. A skin friction balance for measuring the skin friction drag on the surface of a missile, comprising, a skin friction measuring system and a counterweight system having equal masses and having the same center of gravity in space, a base supporting said systems, means connecting said systems including a first pair of rotatable discs so that said systems are insensitive to linear acceleration forces, means connecting said second system to a second pair of discs having the same mass moment of inertia as said first pair of discs so that said discs are insensitive to angular acceleration forces, a floating test piece section of the surface of said missile being attached to said measuring system, means attached to said measuring system and said base for sensing the response of said section to skin friction drag, said balance, with the exception of said test piece, being disposed entirely within said missile when operatively associated therewith, whereby the constituent components thereof are contained within and are supported by the missile.

8. A skin friction balance for measuring the skin friction drag on the surface of a missile, comprising, a base having a recess therein, a transformer including a movable core and an adjustable coil, means for adjustably mounting said coil in said recess, a skin friction measuring system including a floating surface element test piece mounted on said base, means for securing said transformer core to said measuring system so that it is movable with respect to said coil, a counterweight system mounted on said base and surrounding said measuring system, said measuring system and counterweight system having equal masses and identical centers of gravity in space and frictionless means for interconnecting said systems so that they are insensitive to acceleration forces, whereby the displacement of said element and said core is caused solely by skin friction drag acting upon said element, said balance, with the exception of said test piece, being disposed entirely within said missile when operatively associated therewith, whereby the constituent components thereof are contained within and are supported by the missile.

References Cited in the file of this patent
UNITED STATES PATENTS

| | | |
|---|---|---|
| 2,657,574 | Whitehead | Nov. 3, 1953 |
| 2,768,526 | Trimble et al. | Oct. 30, 1956 |
| 2,774,241 | Bennett | Dec. 18, 1956 |
| 2,782,636 | Peucker | Feb. 27, 1957 |
| 2,785,569 | Miller | Mar. 19, 1957 |
| 2,885,891 | Wilson et al. | May 12, 1959 |